United States Patent
Wang

(10) Patent No.: US 11,282,200 B2
(45) Date of Patent: Mar. 22, 2022

(54) METHOD FOR RECOGNIZING MEDICAL IMAGE AND SYSTEM OF SAME

(71) Applicant: MUEN BIOMEDICAL AND OPTOELECTRONIC TECHNOLOGIES INC., Taipei (TW)

(72) Inventor: Chuen-Heng Wang, Taipei (TW)

(73) Assignee: MUEN BIOMEDICAL AND OPTOELECTRONIC TECHNOLOGIES INC., Taipei (TW)

(*) Notice: Subject to any disclaimer, the term of this patent is extended or adjusted under 35 U.S.C. 154(b) by 0 days.

(21) Appl. No.: 17/022,126

(22) Filed: Sep. 16, 2020

(65) Prior Publication Data

US 2021/0090258 A1 Mar. 25, 2021

(30) Foreign Application Priority Data

Sep. 19, 2019 (TW) .................................. 108133858

(51) Int. Cl.
*G06K 9/00* (2006.01)
*G06T 7/00* (2017.01)

(52) U.S. Cl.
CPC .. *G06T 7/0014* (2013.01); *G06T 2207/10081* (2013.01); *G06T 2207/10116* (2013.01); *G06T 2207/10132* (2013.01); *G06T 2207/20081* (2013.01); *G06T 2207/20084* (2013.01); *G06T 2207/30041* (2013.01)

(58) Field of Classification Search
CPC ......... G06T 7/0014; G06T 2207/10081; G06T 2207/10116; G06T 2207/10132; G06T 2207/20081; G06T 2207/20084; G06T 2207/30008; G06T 2207/30012; G06T 2207/30061; G06T 2207/30064; G06T 2207/30041
See application file for complete search history.

(56) References Cited

U.S. PATENT DOCUMENTS

| | | | |
|---|---|---|---|
| 2018/0308234 A1 | 10/2018 | Chen et al. | |
| 2021/0035689 A1* | 2/2021 | Liu | G06N 3/0472 |
| 2021/0042920 A1* | 2/2021 | Fu | G06T 7/0012 |
| 2021/0224977 A1* | 7/2021 | Jia | G06K 9/6267 |

FOREIGN PATENT DOCUMENTS

| | | |
|---|---|---|
| CN | 109670530 A | 4/2019 |
| CN | 110223289 A | 9/2019 |
| TW | 201839634 A | 11/2018 |

* cited by examiner

*Primary Examiner* — Atiba O Fitzpatrick
(74) *Attorney, Agent, or Firm* — Mark M. Friedman

(57) ABSTRACT

The present disclosure provides a method and a system for recognizing medical image, the present disclosure utilizes the image data with markers of different diseases for calculating and analyzing to build a pre-trained model, the present disclosure has significant improvements to improve the accuracy of image recognition under the general situation of insufficient effective data in the field of medical image recognition technology, the present disclosure can be applied to the field of medical image recognition technology, including X-ray, CT, MRI, ultrasonic, pathological slice photography or fundus photography.

5 Claims, 7 Drawing Sheets

METHOD FOR RECOGNIZING MEDICAL IMAGE AND SYSTEM OF SAME

BACKGROUND OF INVENTION

Field of Invention

The present disclosure relates to the field of medical image recognition, and more particularly, to a method and a system for medical image recognition applied to X-ray, computerized tomography (CT), magnetic resonance imaging (MRI), ultrasound, pathological slice photography or fundus photography. The method and system are used to establish a pre-trained model based on medical images to improve the accuracy of medical image classification, target detection, segmentation and other applications.

Description of Prior Art

In recent years, because ImageNet has provided databases of millions images, such as cats, dogs, airplanes, bicycles, and different types of object pictures, the artificial intelligence image recognition technology with deep learning neural network technology has been built to be driven by big data. The current deep learning technology of artificial intelligence can have a recognition accuracy close to human capabilities, when applied to the identification of most objects in nature.

Pre-train models using neural networks built by using ImageNet are becoming more and more mature. As shown in FIG. 1, the conventional pre-training model uses database with large number images provided by ImageNet via the model established after the Convolution Neural Network (CNN) of the first convolution layer 42, the second convolution layer 44, and the third convolution layer 46 calculates and analyzes as the base structure 40, which changes the last few layers close to the final recognition output result to a suitable application as a full connection layer 48, which can be applied to image classification, value prediction (regression), target detection, segmentation and the like in the field of image recognition technology for related objects.

However, due to the confidentiality of personal medical information, public databases such as ImageNet lack a large number of medical images for medical image recognition technology, and because the number of images for a single case is limited, it is difficult to improve the accuracy of pre-training model of medical images. Therefore, the establishment of pre-trained models based on medical images to further improve the accuracy of medical image classification, target detection, segmentation and other applications has become an important goal in the field of artificial intelligence technology.

SUMMARY OF INVENTION

The present disclosure relates to the field of medical image recognition, and more particularly, to a method and a system for medical image recognition applied to X-ray, computerized tomography (CT), magnetic resonance imaging (MRI), ultrasound, pathological slice photography or fundus photography. The method and system are used to establish a pre-trained model based on medical images to improve the accuracy of medical image classification, target detection, segmentation and other applications.

The present disclosure provides a method for recognizing medical image, the method comprises steps of:

step S1: inputting a plurality of image data with a plurality of types of disease markers, each image data having at least a disease marker;

step S2: establishing a first pre-trained model, and simultaneously training the first pre-trained model in a mixed manner with the plurality of image data having the plurality of types of disease markers;

step S3: inputting an image data with a first disease marker into the first pre-trained model;

step S4: establishing a second pre-trained model by using the first pre-trained model as a base structure; and step S5: training and verifying the second pre-trained model by using the image data with the first disease marker.

In the method for recognizing medical image of present disclosure, wherein the step S4 further comprises a step S41 of freezing parameters of at least a convolution layer of the first pre-trained model.

In the method for recognizing medical image of present disclosure, wherein the plurality of types of disease markers comprises at least three types of disease markers.

In the method for recognizing medical image of present disclosure, wherein the plurality of image data are the image data with same format.

In the method for recognizing medical image of present disclosure, wherein the format of the image data is one of X-ray, computerized tomography (CT), magnetic resonance imaging (MRI), ultrasound, pathological slice photography or fundus photography.

The present disclosure further provides a system for recognizing medical image, the system comprises:

a base structure comprising a first convolution layer, a second convolution layer and a third convolution layer, wherein the first convolution layer, the second convolution layer and the third convolution layer are used to build a pre-trained model by calculating and analyzing at least a first image data with a first disease marker and a second image data with a second disease marker;

a fourth convolution layer or a first full connection layer being trained for recognizing whether an outputting data has a first symptom of the first disease, wherein the outputting data is outputted from the pre-trained model built by the base structure; and a fifth convolution layer or a second full connection layer being trained for recognizing whether an outputting data has a second symptom of the second disease, wherein the outputting data is outputted from the pre-trained model built by the base structure.

In the system for recognizing medical image of present disclosure, wherein the system further comprises a sixth convolution layer or a third full connection layer being trained for recognizing whether an image data has a third disease symptom, after the pre-trained model is pre-trained by the first image data with the first disease marker and the second image data with the second disease marker.

In the system for recognizing medical image of present disclosure, wherein the system freezes parameters of at least one convolution layer in the base structure when recognizing the image data with the third disease symptom.

In the system for recognizing medical image of present disclosure, wherein the image data with the first disease marker, the second disease marker and the third disease marker are the image data with same format.

In the system for recognizing medical image of present disclosure, wherein the format of the image data is one of X-ray, computerized tomography (CT), magnetic resonance imaging (MRI), ultrasound, pathological slice photography or fundus photography.

The present disclosure can be applied to technology field of medical image recognition, including X-ray, CT, MRI, ultrasound, pathological slice photography, or fundus photography, etc. The present disclosure can also be applied to medical image classification, value prediction (regression), target detection, segmentation and other applications. The present disclosure uses the image data with markers of different diseases for calculating and analyzing to build a pre-trained model, the present disclosure has significant improvements to improve the accuracy of image recognition under the general situation of insufficient effective data in the field of medical image recognition technology.

BRIEF DESCRIPTION OF DRAWINGS

In order to illustrate the technical solutions of the embodiments of the present disclosure more clearly, the following detailed description and drawings with reference to the exemplary embodiments of the present disclosure are concisely described below. Obviously, the specific embodiments described herein are only some examples of the present disclosure. Based on the following drawings, a person skilled in the art may obtain further drawings without making inventive effort.

DETAILED DESCRIPTION OF INVENTION

Figure 1:
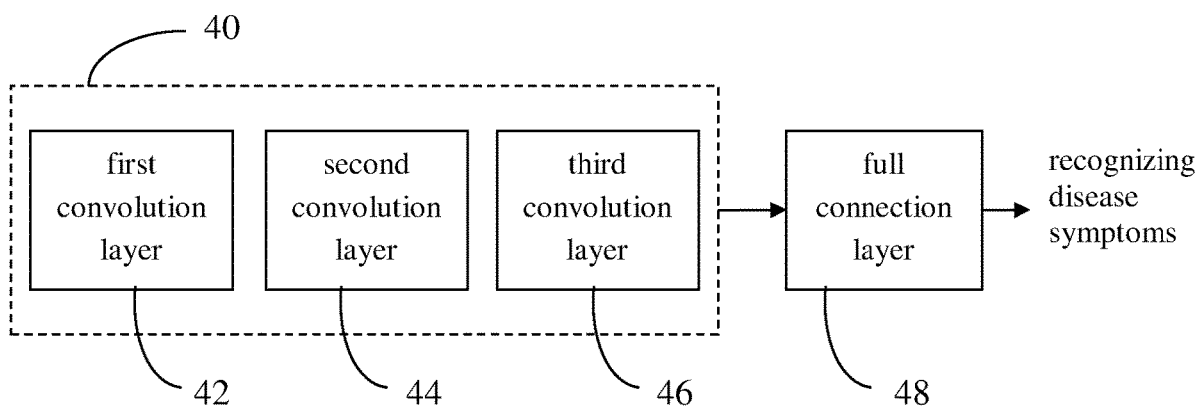
FIG. 1 is a schematic view of a conventional technique.
Figure 2:
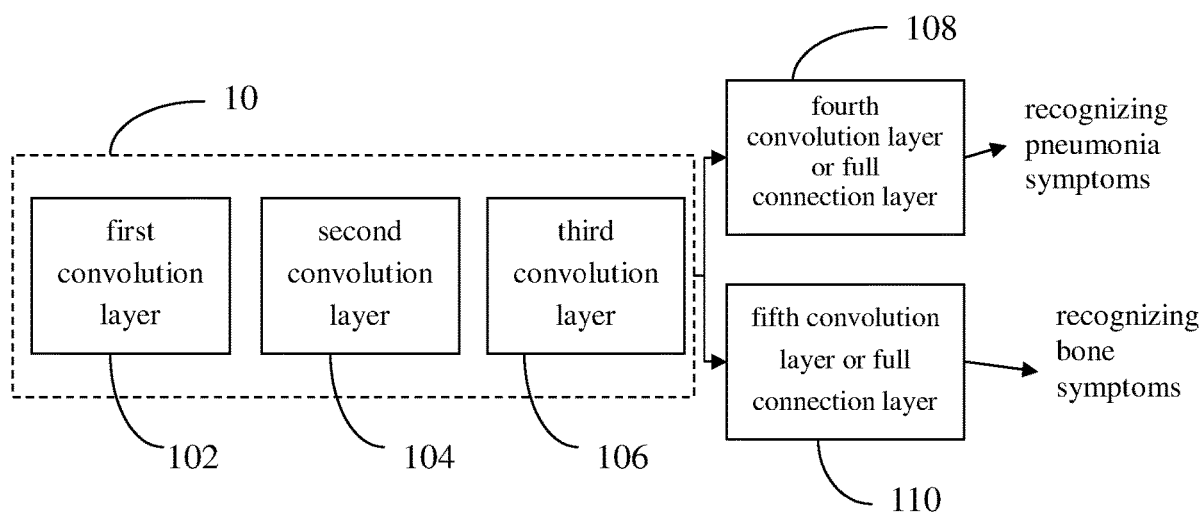
FIG. 2 is a schematic view of a medical image recognition system according to a first embodiment of the present disclosure.

In the development of artificial intelligence recognition technology for medical imaging, the most commonly encountered problem when it is often necessary to determine the symptoms of a disease, the amount of valid data available for the disease is much fewer than valid data for other natural field. Under the large quantity data-driven model, the effective data quantity is one of the important factors for the accuracy of the model. In the artificial intelligence recognition technology of medical images, a common image database such as ImageNet is often used as the base structure of a pre-trained model. However, medical images are not usually visible image data in nature. There are large differences in the image data of nature. The recognition of multi-task pre-trained models created using images from different diseases have higher accuracy than only using general-purpose image databases such as ImageNet as pre-trained models. Therefore, the present disclosure uses a large number of images showing different diseases but all in the same situation (such as, X-ray, CT, MRI, ultrasound, pathological slice photography or fundus photography) to build a pre-trained model via a multi-task way, and then use this pre-trained model as a base structure applying to diagnose a certain disease. According to the specific embodiment disclosed in the present disclosure, please refer to the medical image recognition system of a first embodiment shown in FIG. 2, for example, the Radiological Society of North America (hereinafter referred to as "RSNA") and the Leland Stanford Junior University in United States (hereinafter referred to as "Stanford University") provide tens of thousands of medical image databases. RSNA provides about 30,000 chest X-ray images, all of which are labeled as normal or pneumonia, Stanford University provides more than 10,000 orthopedic X-ray image database called MURA (Musculoskeletal Radiographs), which all have marks indicating normal or abnormal. We use these two completely different diseases and different parts of X-ray medical imaging data to build a multi-task training model. The base structure 10 in the first embodiment uses a Convolution Neural Network (CNN) via a first convolution layer 102, a second convolution layer 104, and a third convolution layer 106 to build a model by calculating and analyzing more than 30,000 chest X-ray images provided by RSNA and more than 10,000 orthopedic X-ray images provided by MURA. The data calculated and analyzed by the base structure 10 are respectively passed through a fourth convolutional layer (or a full connection layer) 108 and a fifth convolutional layer (or a full connection layer) 110 to train them to recognize the results of pneumonia or bone abnormality features respectively. The number of convolution layers in this embodiment can be adjusted according to actual application requirements. In the practical application of this embodiment, other computing layers may also be added according to different requirements, such as a rectified linear Layer, a pooling layer, and the like. The field of image recognition applicable to the present disclosure is not limited to the field of pneumonia or bone image recognition illustrated in this embodiment.

Figure 3:
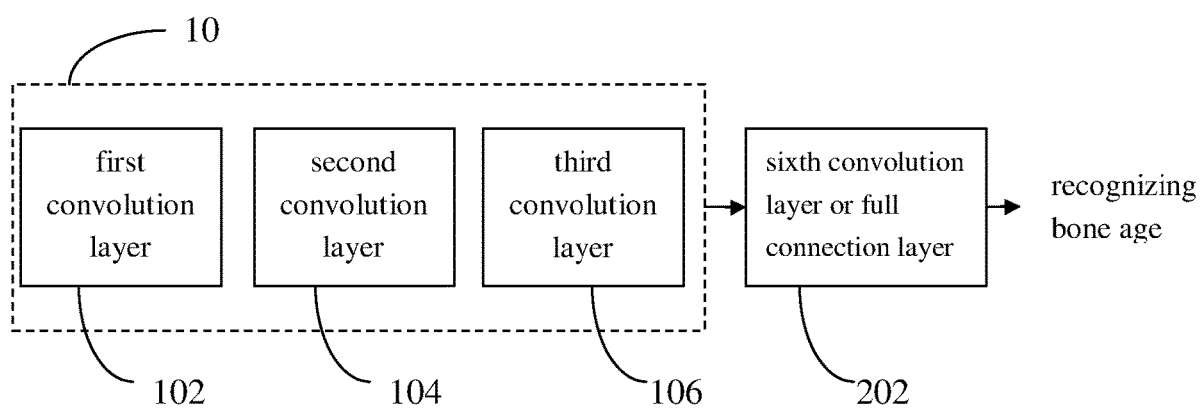
FIG. 3 is a schematic view of a medical image recognition system according a second embodiment of the present disclosure.

After the above pre-training is completed, the base structure 10 of this pre-trained model is applied to the image database of bone age prediction provided by RSNA to establish a model that can identify bone age. Referring to the medical image recognition system of a second embodiment shown in FIG. 3, the base structure 10 calculates and analyzes the image database of the bone age prediction provided by the RSNA through the first convolution layer 102, the second convolution layer 104 and the third convolution layer 106, the output data is passed through a sixth convolution layer (or a fully connected layer) 202 to identify the bone age. The number of convolution layers in this embodiment can be adjusted according to actual application requirements. In the practical application of this embodiment, other computing layers may also be added according to different requirements, such as a rectified linear Layer, a pooling layer, and the like. The field of image recognition applicable to the present disclosure is not limited to the field of bone age image recognition illustrated in this embodiment.

Figure 4:
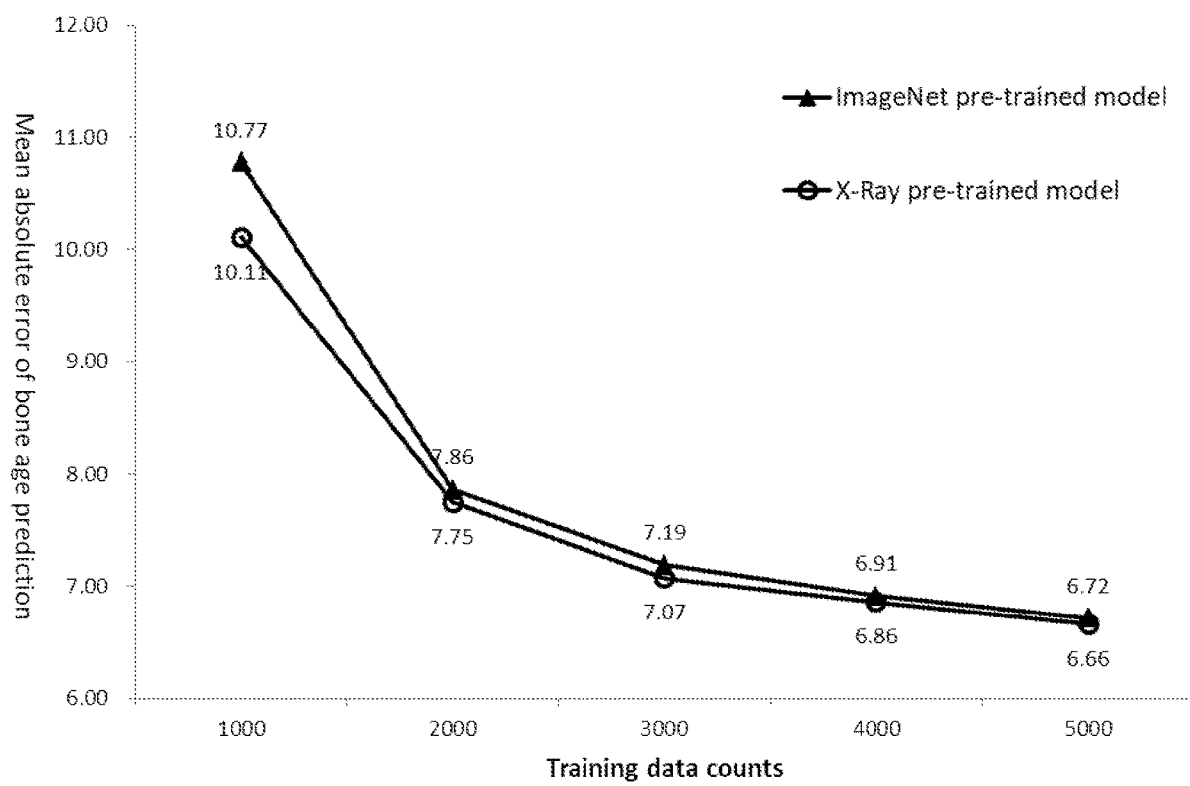
FIG. 4 is an experimental accuracy analysis chart of the second embodiment of the present disclosure.

Referring to FIG. 4, it is experimentally confirmed that under different levels of magnitude of data, the accuracy rate of image recognition obtained by using the pre-trained model of the present disclosure is higher than the model established using ImageNet, especially in the case of less data, the magnitude of the improvement is more obvious. It is obviously helpful to improve the accuracy of image recognition under the circumstance that the amount of effective data is insufficient in the field of medical image recognition technology.

Figure 5:
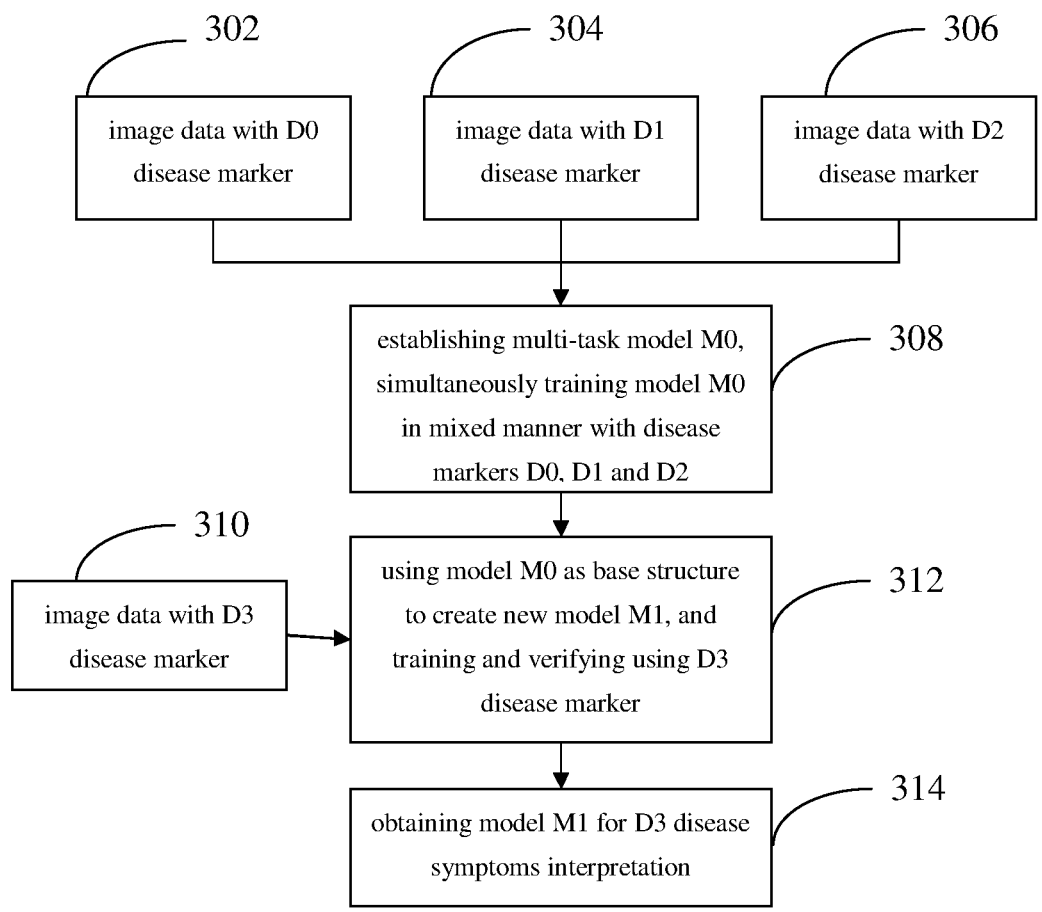
FIG. 5 is a flowchart of a third embodiment of the present disclosure.

Referring to the third embodiment shown in FIG. 5, the third embodiment is a method flowchart of establishing a pre-trained model of medical images, which includes the following steps:

step 302: inputting image data with a D0 disease marker;

step 304: inputting image data with a D1 disease marker;
step 306: inputting image data with a D2 disease marker;
step 308: establishing a multi-task model M0, and simultaneously training the model M0 in a mixed manner with the disease marker image data such as D0, D1 and D2;
step 310: inputting the image data with a D3 disease marker into the model M0;
step 312: using the model M0 as the base structure to create a new model M1, and using the image data with the D3 disease marker to train and verify the model M1;
step 314: obtaining a model M1 for D3 disease symptoms interpretation.

During the training of the pre-trained model in the third embodiment, the total number of different disease marker types used in steps 302, 304, and 306 are at least two or more types, and each image data has at least one disease marker, the number can be increased according to the needs of the actual application.

Figure 6:
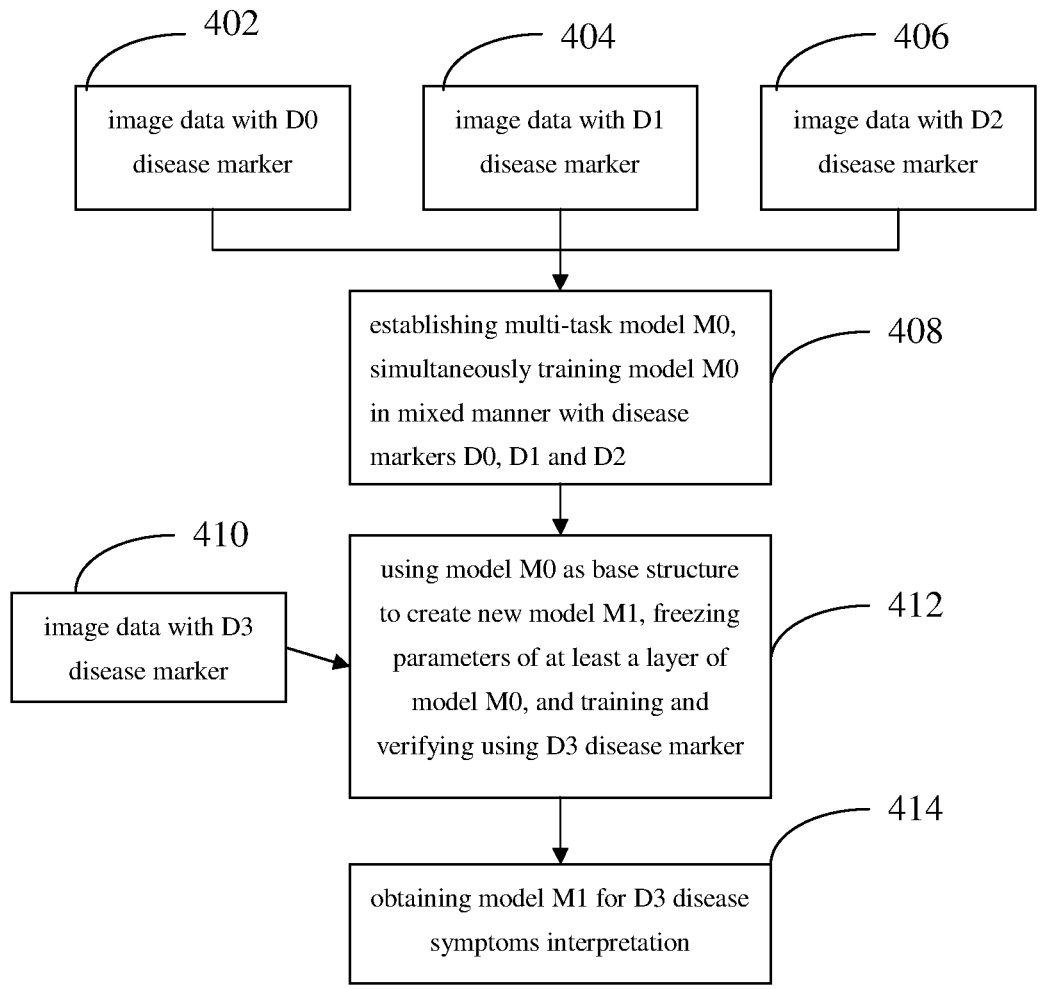
FIG. 6 is a flowchart of a fourth embodiment of the present disclosure.

Since the features of the preceding few layers of the pre-trained model are similar under the same image recognition application scenario, the parameters of the preceding few layers can be frozen during training to improve the accuracy of image recognition. Referring to the fourth embodiment shown in FIG. 6, the fourth embodiment is a method flowchart of establishing a pre-trained model of medical images, in which parameters of at least one convolution layer in a base structure are frozen. The method flowchart of the fourth embodiment includes the following steps:
step 402: inputting image data with a D0 disease marker;
step 404: inputting image data with a D1 disease marker;
step 406: inputting image data with a D2 disease marker;
step 408: establishing a multi-task model M0, and simultaneously training the model M0 in a mixed manner with image data of disease markers such as D0, D1 and D2;
step 410: inputting image data with a D3 disease marker into the model M0;
step 412: using the model M0 as a base structure to establish a new model M1, freeze parameters of at least one convolution layer of M0, and train and verify the model M1 using image data with the D3 disease marker;
step 414: obtaining a model M1 for D3 disease symptoms interpretation.

During the training of the pre-trained model in the fourth embodiment, the total number of different disease marker types used in steps 402, 404, and 406 are at least two or more types, and each image data has at least one disease marker, the number can be increased according to the needs of the actual application.

Figure 7:
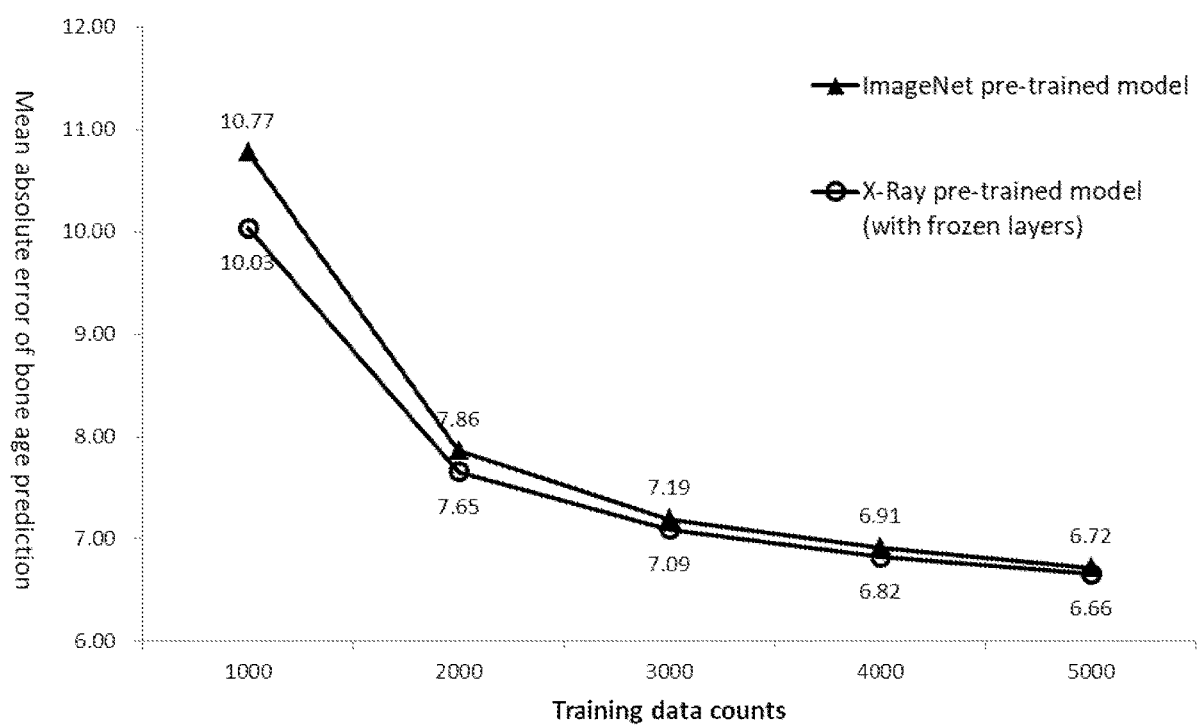
FIG. 7 is an experimental accuracy analysis chart of the fourth embodiment of the present disclosure.

Referring to FIG. 7, it is experimentally confirmed that under the same image recognition application scenario, experimental analysis of different levels of magnitude is performed, the parameters of several preceding convolution layers are frozen, and only the convolution layers after the specific preceding convolution layers are trained, the prediction accuracy of the obtained pre-trained model can be increase. The improvement of the prediction accuracy is more obvious especially in the case of less data. The accuracy rate of image recognition obtained by using the pre-trained model of the present disclosure having frozen several preceding convolution layers frozen is higher than the model established using ImageNet, especially in the case of less data, the magnitude of the improvement is more obvious. It is obviously helpful to improve the accuracy of image recognition under the circumstance that the amount of effective data is insufficient in the field of medical image recognition technology.

The above embodiments are only exemplary implementations of the present invention. The applicable fields of the present invention are not limited to the specific medical imaging fields exemplified in the above embodiments. The present invention can also be used in medical image classification for other diseases in the same situation (for example: X-ray, CT, MRI, ultrasound, pathological slice photography, or fundus photography, etc.). The present invention can also be applied to medical image classification, value prediction (regression), target detection, segmentation and other applications.

What is claimed is:

1. A system for recognizing medical image, comprising:
a base structure comprising a first convolution layer, a second convolution layer and a third convolution layer, wherein the first convolution layer, the second convolution layer and the third convolution layer are used to build a pre-trained model by calculating and analyzing at least a first image data with a first disease marker and a second image data with a second disease marker;
a fourth convolution layer or a first full connection layer being trained for recognizing whether an outputting data has a first symptom of the first disease, wherein the outputting data is outputted from the pre-trained model built by the base structure; and
a fifth convolution layer or a second full connection layer being trained for recognizing whether an outputting data has a second symptom of the second disease, wherein the outputting data is outputted from the pre-trained model built by the base structure.

2. The system for recognizing medical image according to claim 1, wherein the system further comprises a sixth convolution layer or a third full connection layer being trained for recognizing whether an image data has a third disease symptom, after the pre-trained model is pre-trained by the first image data with the first disease marker and the second image data with the second disease marker.

3. The system for recognizing medical image according to claim 2, wherein the system freezes parameters of at least one convolution layer in the base structure when recognizing the image data with the third disease symptom.

4. The system for recognizing medical image according to claim 2, wherein the image data with the first disease marker, the second disease marker and the third disease marker are the image data with same format.

5. The system for recognizing medical image according to claim 4, wherein the format of the image data is one of X-ray, computerized tomography (CT), magnetic resonance imaging (MRI), ultrasound, pathological slice photography or fundus photography.

* * * * *